United States Patent [19]

Grooss

[11] 4,149,733
[45] Apr. 17, 1979

[54] FUEL TANKS AND BUMPER FOR LOADER

[75] Inventor: Frank A. Grooss, Morton, Ill.

[73] Assignee: Caterpillar Tractor Co., Peoria, Ill.

[21] Appl. No.: 859,363

[22] Filed: Dec. 13, 1977

[51] Int. Cl.² ............................................. B60K 15/08
[52] U.S. Cl. ..................................... 280/5 A; 293/117
[58] Field of Search ...................... 280/5 R, 5 A, 5 H; 293/69 R; 173/23, 22

[56] References Cited

U.S. PATENT DOCUMENTS

| | | | |
|---|---|---|---|
| 2,454,070 | 11/1948 | Tourneau | 280/5 R |
| 2,530,819 | 11/1950 | Hamlin | 280/5 H |
| 2,725,223 | 11/1955 | McCallum | 280/5 A |
| 2,794,569 | 6/1957 | McCuen | 280/5 H |
| 4,023,823 | 5/1977 | Saunders | 293/69 R |

FOREIGN PATENT DOCUMENTS 2332926  6/1977  France ..................................... 280/5 H

*Primary Examiner*—John A. Pekar
*Attorney, Agent, or Firm*—Wegner, Stellman, McCord, Wiles & Wood

[57] ABSTRACT

A low-profile vehicle, such as a loader for use in a mine or the like, has fuel tanks secured to the rear of the main frame to form the rear bumpers and counterweights for the vehicle. A center bumper is attached to the tanks and extends therebetween. The center bumper has a cutout intersected by a draw pin. The tanks are interconnected by a common drawtube from which fuel is picked up for and returned from the engine. Apertured stiffening plates are mounted in the tanks to reinforce the walls of the tank and to form baffles for the fuel in the tanks. Vents, guards, quick fill and conventional fuel inlets are provided on the tank.

15 Claims, 6 Drawing Figures

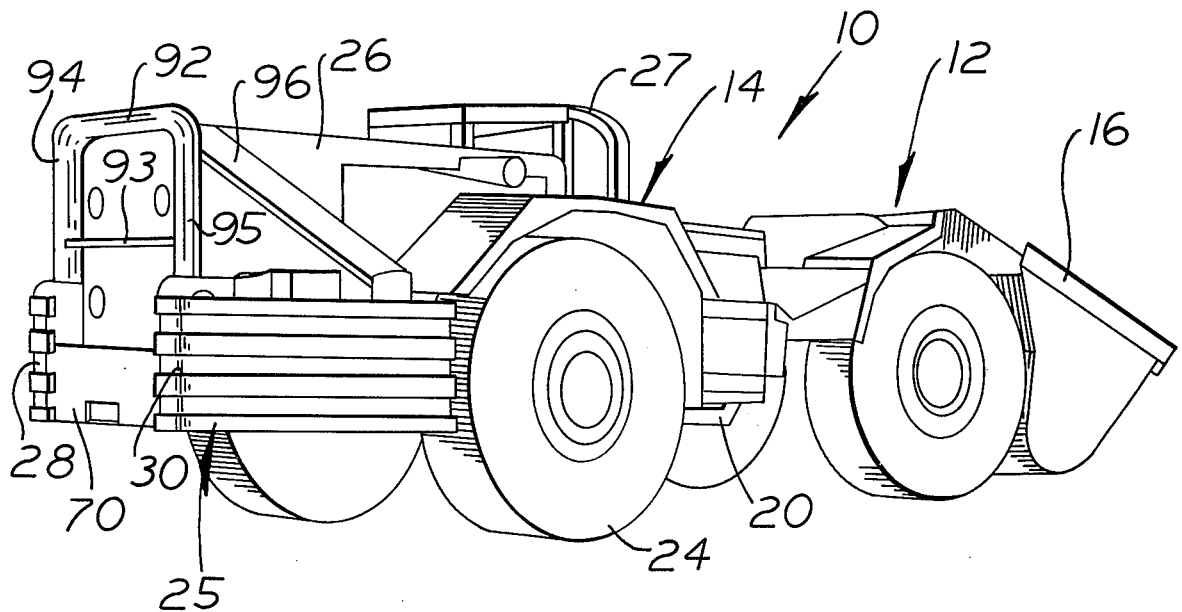
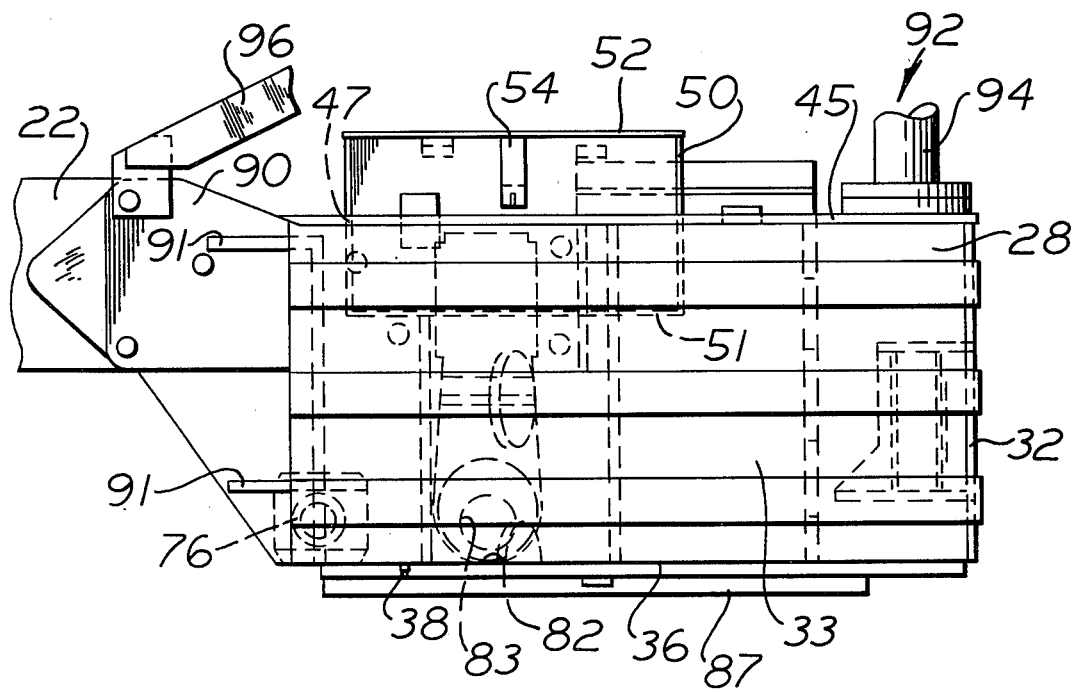

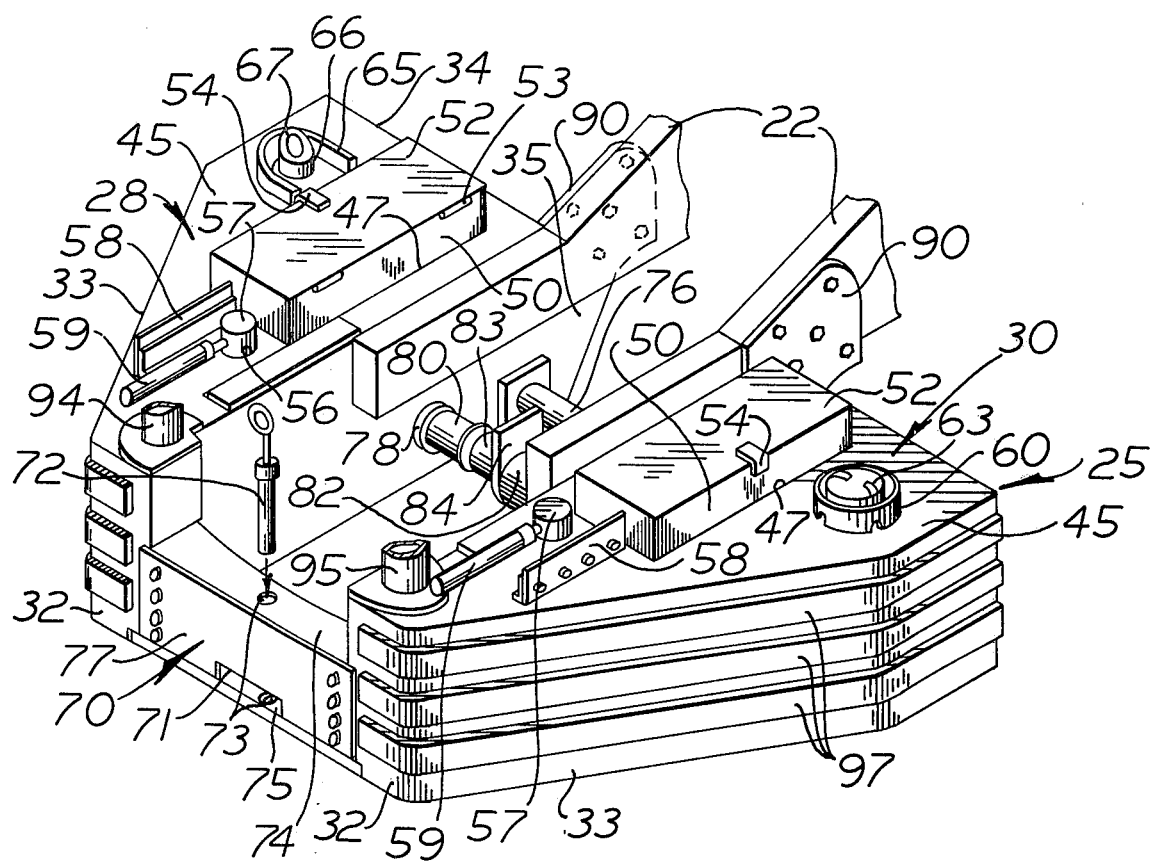
Fig_3_
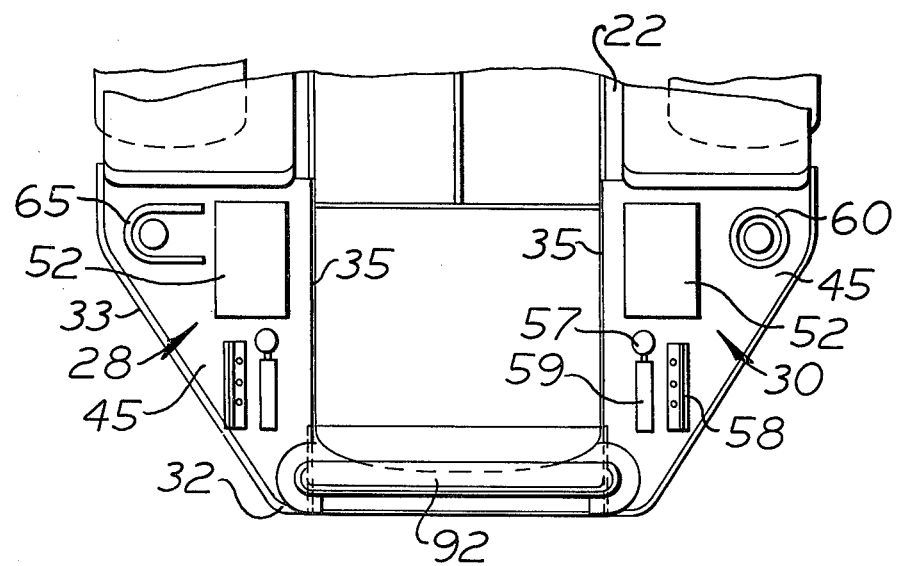
Fig_5A_

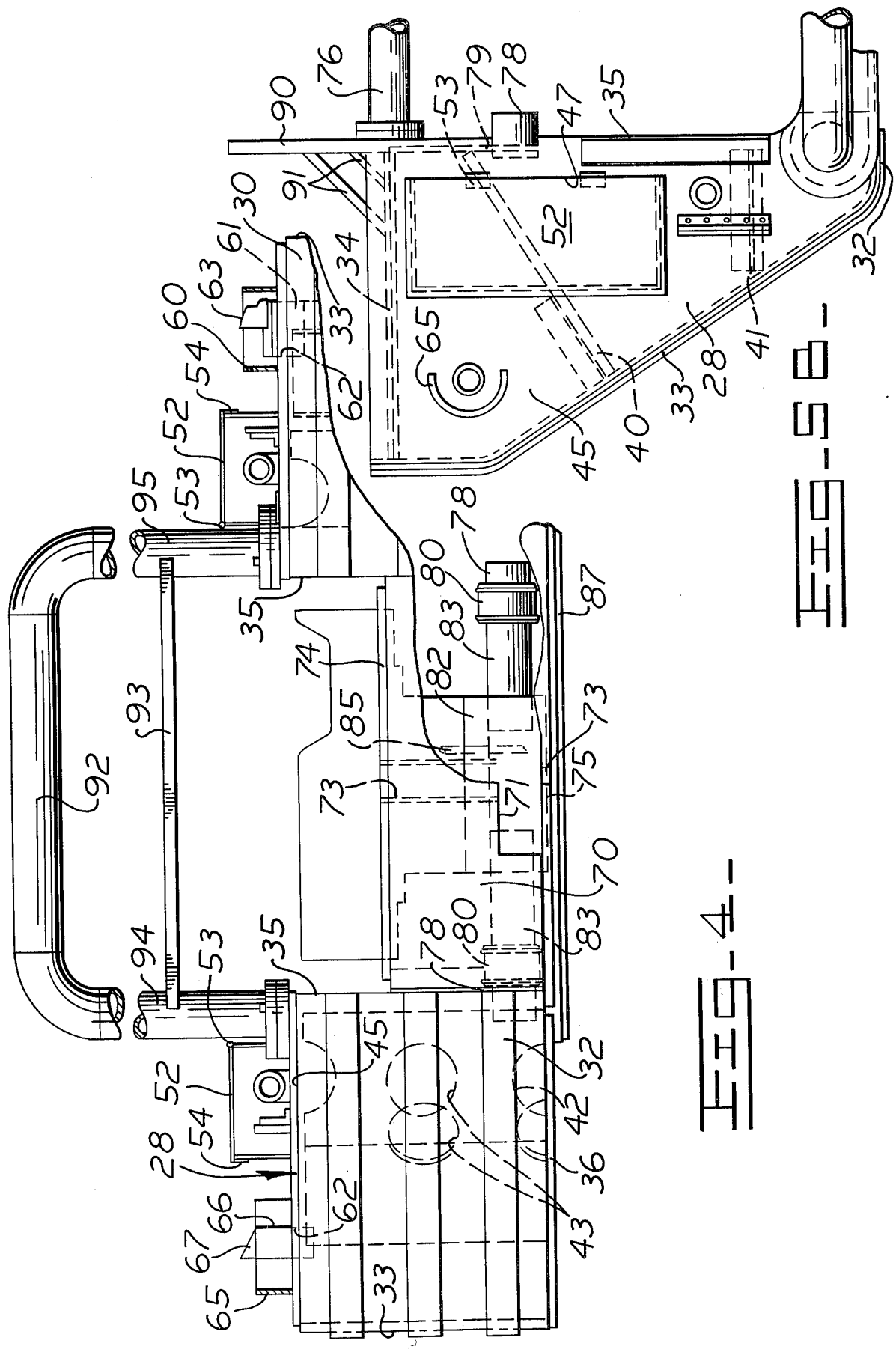

FUEL TANKS AND BUMPER FOR LOADER

BACKGROUND OF THE INVENTION

1. Field of the Invention

This invention relates to low-profile vehicles and, more particularly, to an improved combined fuel tank, rear bumper and counterweight assembly for said vehicle.

2. Description of the Prior Art

Low-profile vehicles, primarily for use in mines and other areas having low overhead clearance, must be compact and still retain the functional capabilities necessary to do the intended work. In order to lower the profile of the vehicle, it has been necessary to relocate essential elements of the vehicle, such as the operator's cab, and the like. In relocating the operator's cab to a position where the operator will have an adequate field of vision so as to operate the equipment effectively, it was desirable to place the cab on the side of the vehicle, thus displacing other elements of the vehicle previously attached at that location. One such element that had to be relocated was the fuel tank. One area that was available for locating the tanks was rearward of the rear wheels, but that area was potentially exposed to external abuse during use of the vehicle. The relocation of the fuel tanks rearward of the rear wheels also necessitated relocating the venting and filling connections for the tanks, as well as the relocating of the fuel pick up for drawing fuel from the tanks. The exposed tank had to be protected and reinforced to prevent damage thereto. Fuel tanks have been made an integral part of a main frame as have water tanks been combined with a rear bumper, however, in both cases, problems resulted such as limiting the ability to modify the frame due to the location of the fuel tanks as part of the frame and frequent rupture of the water tanks in the bumper.

SUMMARY OF THE INVENTION

The present invention is directed to overcoming one or more of the problems as set forth above.

According to the present invention, a pair of reinforced fuel tanks are rigidly secured to the rear portion of the frame of the vehicle on either side of the engine mount on the frame of the vehicle and forms the outer periphery of the rear of the vehicle. The tanks are interconnected by a center bumper extending between the facing rear corners of the tanks, which center bumper has a cut out portion which is intersected by a draw pin for use in connecting a cable, or the like, to another vehicle. The pair of tanks and the center bumper form the rear bumper for the vehicle with the rearward and sidewardly projecting walls of the tanks having a plurality of wear and reinforcing strips attached to the outer surface thereof. A common drawtube is connected to the two tanks and has a fuel take off or fuel pick up element associated therewith for drawing fuel for use by the engine.

Stiffening or reinforcing plates extend diagonally across the inner portions of each tank, which plates are apertured so as to serve the dual function of acting as baffles for the fluid in the tanks. The tanks, when both full or empty, act as counterweights for the vehicle because of their substantial rearward mounting on the vehicle. Appropriate vents are provided for each tank and one tank has a quick-fill cap while the other tank has a conventional cap so that both tanks can be filled from one cap using the appropriate type of filling equipment.

A roll bar or guard extends upwardly from between the rear corners of the tanks to protect the tanks and the engine from damage. A belly guard is secured below the tanks to protect the tanks and the area between the tanks, including the drawtube, from damage from flying objects from below. Recesses are formed in the top of the respective tanks in which is secured a housing for receiving and holding a pair of batteries for use by the engine of the vehicle.

BRIEF DESCRIPTION OF THE DRAWING

The details of construction and operation of the invention are more fully described with reference to the accompanying drawing which forms a part hereof and in which like reference numerals refer to like parts throughout.

In the drawing:

FIG. 1 is an elevational view of a low-profile vehicle incorporating the invention therein;

FIG. 2 is an enlarged side elevational view of a tank, bumper and counterweight assembly of the invention;

FIG. 3 is a perspective view of the improved combined fuel tank, bumper and counterweight assembly;

FIG. 4 is a rear elevational view of the tanks with parts broken away;

FIG. 5A is a top plan view, somewhat reduced in size, of the rear end of the vehicle showing the combined fuel tank, bumper and counterweight; and, FIG. 5B is a top plan view of one tank, bumper and counterweight assembly showing structural details of the invention.

DESCRIPTION OF THE PREFERRED EMBODIMENT

FIG. 1 illustrates a low-profile loader vehicle 10, for use in a mine or in other low overhead areas, comprised of a front member 12 articulated with respect to a rear member 14. The front member 12 has appropriate links and hydraulics for raising, lowering, and otherwise maneuvering, a front loader bucket 16. The rear member 14 has a rigid frame 20 with a rear portion 22 terminating rearward of the mounting of the rear wheels 24 to the member 14. A combined fuel tank, rear bumper and counterweight assembly 25 is secured to said rear portion 22 of the frame 20. An engine 26 is mounted to said rear member 14 and partially overlaps the midportion of the combined bumper, fuel tank and counterweight assembly 25. An operator's station, covered by a protective canopy 27, is mounted on the rear member 14 of the vehicle on the far side of the vehicle as shown in FIG. 1.

The combined bumper, fuel tank and counterweight assembly 25 is comprised of a pair of tanks 28,30 which, in the illustrated form, have the one outer corner cut off at an angle to provide a somewhat triangular-shaped tank on each side of the member 25. Only one tank, tank 28, will be described in detail, it being understood that all common features will be described only once. However, in those places where different elements are located on the different tanks 28,30, a separate description will be made of said different elements.

The tank 28 is provided with a shaped, relatively thick rear wall 32, exposed outside wall 33, front wall 34 and protected side wall 35. A bottom wall 36 is secured to the bottom edges of the rear, side, front and side walls of the tank and has an appropriate drain cock 38 affixed thereon and opening into the tank. Inside the tank, a stiffener plate 40 extends angularly from the forward portion of the side wall 35 (see FIG. 6) to the midportion of the outside wall 33 for reinforcing said outside wall against external blows and the like. A second stiffener plate 41 extends from the side wall 35 toward the outside wall 33 at the narrow portion of the tank. The stiffener or reinforcing plates 40,41 have partial openings 42 or complete openings 43 therethrough at staggered locations so as to permit said plates 40,41 to also serve as baffles for the fuel in the tanks. A top wall 45 is welded to the top of the rear, side, front and side walls, which top wall 45 has a rectangular-shaped cutout 47 therein.

A rectangular-shaped receptical 50 is secured, as by welding, in the cutout 47 with a bottom 51 of the receptical 50 disposed below the plane of the top wall 45 and a cover 52 disposed above said plane of the top wall and being hinged at 53 to the receptical. A latch 54 is provided for securing said cover to the receptical 50. The receptical 50 is used as a storage compartment for a battery for the vehicle. Also extending through the top wall 45 is a vent opening 56 in which is mounted a vent 57 which is protected by a vent guard 58 bolted to the top wall 45 of the tank. A flexible tube 59 is mounted on the outlet of the vent 57 so as to exhaust the fumes from the tank 28,30 rearward of the vehicle.

Tank 30 has a guard ring 60 secured to the top wall 45 around a conventional filler tube 61 which extends through an opening 62 in said top wall. A filler cap 63 is a conventional cap which can be threaded or otherwise connected to the top of the filler tube 61 through which the tanks can be filled by conventional nozzles. Tank 28 has a U-shaped guard 65 surrounding an opening 62 in the top wall 45 of said tank 28. The opening 62 has a filler tube 66 with a quick-fill coupling 67 communicating therewith. It is possible to fill both tanks 28,30 through the quick-fill coupling 67 by using appropriate quick-fill equipment.

Tanks 28 and 30 are connected together at the rear portion of the side walls 35 by a box-shaped center bumper 70 which is either bolted to flanges projecting outwardly from the respective rear walls 32 of the tanks or is welded to the side walls 35 thereof. The center bumper 70 has a cut out opening 71 in the lower midportion of the rear wall 77 thereof which cut out opening 71 is intersected by a draw pin 72 which is inserted through aligned apertures 73,73 in the top wall 74 and bottom wall 75 of said center bumper 70. With the draw pin 72 in place, it is possible to loop a cable, or other attaching equipment, through the opening 71 and around the draw pin 72 so that the vehicle can be used to pull or be pulled therewith. A support brace 76 is extended between the forward edges of the facing walls 35,35 of the tanks near the lower forward corners thereof. The support brace 76 is bolted, or otherwise secured, to the forward portion of the side walls 35 to rigidly support the forward portions of the tanks. The center bumper 70 and the brace 76 secure the tanks 28,30 together as a unit.

Stub tubes 78 pass through openings 79 in the facing side walls 35 of the respective tanks 28,30 near the bottom edge thereof. A flexible coupling assembly 80 is clamped to each stub tube 78 exterior of said tanks 28,30. A drawtube 82 is mounted between the spaced apart tanks 28,30 with sleeves 83 extending axially outward from the opposite ends thereof. Each sleeve 83 is connected to one of the coupling assemblies 80 so that each tank is connected through the tube 78, flexible coupling 80, sleeve 83 into the drawtube 82 so that there is ready communication between the tanks. The drawtube 82 is supported from some structure of the engine by means of the brackets 84 extending radially therefrom.

As shown in dashed lines in FIG. 4, a take-up tube 85 is mounted in the drawtube 82 which take-up tube is in communication with the fuel system for the engine so that fuel can be withdrawn from and returned to the drawtube 82. A belly guard 87 in the form of a thick steel plate is secured to the bottoms of the tanks 28,30 and bridges the open space between the tanks so as to protect the drawtube 82 and the like from abuse caused by flying rocks and similar debris.

Parallel mounting brackets 90 project forward from the front walls 34 as a continuation of side wall 35. The brackets 90 may be an integral part of side walls 35 or may be welded thereto. The rear portions 22 of the frame extend beyond the brackets 90 into overlapping relationship with the side walls 35 of the tanks and are secured to said walls 35 and to said brackets 90 as by bolting or the like. The attachment to the rear portion 22 of the frame is such as to integrate the combined fuel tank, bumper and counterweight assembly 25 into and to become a part of the frame of the vehicle. Gusset plates 91 extend between the front wall 34 of the tanks 28,30 and the bracket 90 so as to more rigidly support the tanks onto the frame of the vehicle.

A rigid and sturdy inverted U-shaped roll bar or guard 92 is adapted to be rigidly attached to the top walls 45 at the rear corners of the respective tanks 28,30 and extends upwardly and bridges the open space between the tanks 28 and 30. A rod 93 extends between the legs 94,95 of the inverted "U" so as to further rigidify the guard 92. The roll bar or guard 92 is adapted to extend up above the grill of the engine 26 so as to protect the engine from damage. Angle support plates 96 extend from the forward portion of the brackets 90 to the upper portion of the legs 94,95 of the guard so as to further strengthen the guard and to protect the engine.

A plurality of horizontally extending, substantially parallel mounted wear strips 97 are welded, or otherwise secured, to the rear walls 32, and outer side walls 33 of the respective tanks. The strips 97 project outward from the plane of the walls of the tanks so as to be exposed to abrasive contact with infringing surfaces thereby protecting the side walls 33 and rear walls 32 from abuse. As illustrated, three such wear strips are shown although it is understood that more or less wear strips 97 could be used, depending upon the anticipated use of the vehicle.

Due to the heavy gauge of the material forming the walls of the tanks 28,30, as well as the reinforcing and stiffening plates 40,41 and the wear and stiffening strips 97, the tanks 28,30 can serve as a rear bumper. In addition, the bumper and tanks have the weight so located rearward on the vehicle as to form a counterweight for the bucket 16. Thus, a combined fuel tank, rear bumper and counterweight assembly 25 is provided. When the fuel tanks 28,30 are filled with fuel, an additional counterweight effect is added. The tanks 28,30 are mounted rearward of the rear wheels 24 along with the engine in such a way that almost any load capable of being lifted and transported in the bucket 16 will be counterbalanced by the counterweight 25. It should be noted that the outer edges of the fuel tanks on the sides of the vehicle extend substantially coterminous with the outer edges of the tires 24 so as to protect the tires against excessive abrasion along the walls of the tunnel through which the vehicle passes.

An improved low-profile vehicle is provided which minimizes space without sacrificing any of the functional elements of the vheicle. In addition, the common drawtube between the tanks serves to equalize the fuel in the respective tanks together with providing a single pickup for feeding fuel to and from the engine. The combined tank, bumper and counterweight assembly produces an improved vehicle that is highly efficient, relatively easy to service, and substantially trouble-free in use.

The embodiment of the invention in which an exclusive property or privilege is claimed is defined as follows:

1. In a frame construction for a low-profile vehicle, a main frame having a rear portion, a pair of fuel tanks, each fuel tank having a front portion and a rear portion, a center bumper joining the rear portions of said tanks in spaced apart relationship, brackets projecting forward from the front portions of said tanks, said brackets being connected to said main frame to support said tanks on the rear portion of said frame, a drawtube extending between said tanks and connected to both of said tanks, a fuel pick-up means communicating with said drawtube for providing fuel for the vehicle, and a spacer member extending between said tanks forward of said drawtube to protect said drawtube and to hold said forward portions of said tanks rigidly spaced apart.

2. In a frame construction as claimed in claim 1 wherein each tank has a stiffener plate extending across said tank from an inside wall to an outside wall of said tank and wherein said plates have apertures therethrough to serve as fuel baffles in said tanks.

3. In a frame construction as claimed in claim 1 wherein each tank has wear and reinforcing strips secured to an outside wall and a rear wall for protecting said walls from abrasion as said tanks are serving as a rear bumper for said vehicle.

4. In a frame construction as claimed in claim 1 wherein each tank has vent means mounted on a top wall thereof for venting said tank, and wherein fill means are provided on the top wall of each tank for filling said tanks.

5. In a frame construction as claimed in claim 1 wherein a leg of an inverted U-shaped guard is rigidly connected to a top wall of each tank and extends upwardly from said tanks to protect the vehicle from abuse.

6. In a frame construction as claimed in claim 1 wherein said center bumper has an opening in a rear wall thereof and wherein a draw pin is positioned in apertures in said center bumper and intersects said opening whereby a cable can be inserted in the opening and passed around said pin.

7. A low-profile loader vehicle having a main frame and a combined rear bumper and fuel storage assembly attached to said frame, said assembly comprising a pair of fuel tanks each tank having a rear portion and a forward portion, a center bumper joining the rear portions of said tanks in spaced apart relationship, a support brace joining the forward portions of said tanks in spaced apart relationship, a drawtube connected to each of said tanks rearward of said spacer assembly, and a fuel pick-up means extending into said drawtube.

8. A low-profile loader vehicle as claimed in claim 7 wherein a stub tube extends into each tank, a flexible coupling joins each stub tube with a sleeve extending into said drawtube whereby fuel in both tanks flows freely into said drawtube for access to said fuel pick-up means.

9. In a low-profile loader vehicle as claimed in claim 7 wherein stiffener plates extend from an inner wall to an outer wall of each tank and wherein said stiffener plates have openings therethrough so that each plate can also serve as a fuel baffle in said tanks.

10. In a low-profile loader vehicle as claimed in claim 7 wherein each tank has a vent and filler means on a top wall thereof.

11. In a low-profile loader vehicle as claimed in claim 10 wherein one of said filler means on one of said tanks is a quick-fill connector.

12. In a low-profile loader vehicle as claimed in claim 7 wherein said combined rear bumper and fuel storage assembly is of such a mass and is located rearward of a pair of wheels of the vehicle to serve as a counterweight for a loaded bucket of the vehicle.

13. In a frame construction for a low-profile loader vehicle, a main frame terminating rearward of the connection of a pair of rear wheels to the vehicle, a pair of fuel tanks, each fuel tank having a rear portion and a forward portion, a center bumper joining the rear portions of said tanks together in spaced apart relationship, brackets projecting forward from the front portions of said tanks, said brackets being connected to said rearward termination of the main frame, a belly guard secured to a bottom of each of said tanks to protect said tanks and an open area therebetween, a brace extending between the forward portions of said tanks to hold said forward portions of the tanks rigidly spaced apart, a drawtube connected to both of said tanks, a fuel pick-up means extending into said drawtube, a reinforcing plate in each tank extending from an inner wall to an outside wall of said tanks, said plates having apertures therethrough so that said plates serve as fuel baffles in said tanks, vent means mounted on a top wall of each tank for venting said tank, and fill means on each tank for filling said tanks.

14. In a frame construction as claimed in claim 13 wherein a wear strip is secured to the outside wall and to a rear wall of each tank for protecting each tank from abrasion.

15. In a frame construction as claimed in claim 14 wherein an opening is formed in the top wall of each tank, a receptical is affixed in said opening, and a cover is hinged to said receptical for closing said receptical whereby a battery may be stored in said recepticals.

* * * * *